United States Patent [19]

Hasumi et al.

[11] Patent Number: 5,023,135
[45] Date of Patent: Jun. 11, 1991

[54] MAGNETIC RECORDING MEDIUM WHICH CONTAINS A BINDER OF NITROGEN CONTAINING VINYL CHLORIDE POLYMER AND AN AMINO GROUP CONTAINING POLYURETHANE

[75] Inventors: Kazuo Hasumi; Kouichi Mochizuki; Masaaki Fujiyama, all of Kanagawa, Japan

[73] Assignee: Fuji Photo Film Co., Ltd., Kanagawa, Japan

[21] Appl. No.: 290,940

[22] Filed: Dec. 28, 1988

[30] Foreign Application Priority Data

Dec. 28, 1987 [JP] Japan ................. 62-334271

[51] Int. Cl.$^5$ ............................................. G11B 23/00
[52] U.S. Cl. .................................... 428/336; 428/900; 428/694; 428/425.9
[58] Field of Search ............. 428/900, 694, 336, 425.9

[56] References Cited

U.S. PATENT DOCUMENTS

| 4,004,997 | 1/1977 | Tsukamoto et al. | 204/159.14 |
|---|---|---|---|
| 4,521,486 | 6/1985 | Ninomiya et al. | 428/407 |
| 4,556,611 | 12/1985 | Nakajima | 428/694 |
| 4,649,072 | 3/1987 | Ryoke et al. | 428/212 |
| 4,716,077 | 12/1987 | Okita et al. | 428/328 |
| 4,734,330 | 3/1988 | Oiyama et al. | 428/411.1 |
| 4,743,501 | 5/1988 | Eguchi et al. | 428/328 |
| 4,770,941 | 9/1988 | Imai et al. | 428/411.1 |
| 4,784,913 | 11/1988 | Nakamura et al. | 428/411.1 |
| 4,880,692 | 11/1989 | Ryoke et al. | 428/323 |
| 4,880,693 | 11/1989 | Ryoke et al. | 428/323 |
| 4,886,703 | 12/1989 | Hasume et al. | 428/323 |

FOREIGN PATENT DOCUMENTS 8329  1/1962  Japan .

*Primary Examiner*—Bruce H. Hess
*Assistant Examiner*—Stevan A. Resan
*Attorney, Agent, or Firm*—Sughrue, Mion, Zinn, Macpeak & Seas

[57] ABSTRACT

A magnetic recording medium comprising a non-magnetic support having provided thereon a magnetic layer containing magnetic particles dispersed in a binder, the binder comprising
(a) a vinyl chloride polymer resin having a vinyl chloride unit in an amount of 70 wt % or more, nitrogen in an amount of from 0.01 to 1 wt % and a degree of polymerization of from 250 to 700, and
(b) a polyurethane having an amino group in an amount of from $10^{-6}$ to $10^{-3}$ eq/g.

8 Claims, No Drawings

MAGNETIC RECORDING MEDIUM WHICH CONTAINS A BINDER OF NITROGEN CONTAINING VINYL CHLORIDE POLYMER AND AN AMINO GROUP CONTAINING POLYURETHANE

FIELD OF THE INVENTION

This invention relates to a magnetic recording medium, and more particularly it relates to a reliable recording medium having excellent S/N and C/N characteristics and reduced drop outs, and which is resistant to charging.

BACKGROUND OF THE INVENTION

In a magnetic recording medium, a backing layer is generally provided on the surface of a support which is opposite to the surface provided with a magnetic layer in order to improve running stability at rewinding at a high speed rate, and to reduce the wear out of the support. It is known to add electroconductive substances such as carbon black into the backing layer to reduce occurrences of drop outs. The reason for the above addition of the electroconductive substances is to increase electroconductivity (to decrease surface electric resistance) of the magnetic recording medium and to remove the electric charge, whereby dust and contaminants can be prevented from adhering to the magnetic recording medium, and occurrences of drop out can be decreased. However, the above addition of electroconductive substances alone will not achieve sufficient antistatic effects, and prevention of increase of drop outs is also limited.

As an approach for improvement, it has been proposed to add a large supplemental amount of electroconductive substances such as carbon black into the magnetic layer to improve electroconductivity to prevent electrical charging of the magnetic recording medium as described, e.g., in JP-A-58-133626, JP-A-58-158032, JP-A-59-193533. (The term "JP-A" as used herein means an "unexamined published Japanese patent application"). However, when the amount of fillers such as carbon black is increased in the magnetic layer to increase electroconductivity, dispersibility of the magnetic coating composition deteriorates, the surface properties of the magnetic layer deteriorate, or the amount of the magnetic particles in the magnetic layer decreases, whereby desirable electromagnetic characteristics (such as S/N characteristics or drop out) deteriorate. Therefore a satisfactory magnetic recording medium cannot be obtained.

As a result of thorough research by the inventors to solve the above-described problem of enhancing S/N characteristics while preventing drop out, a problem which cannot be solved by conventional technologies, it was found that the above problem can be solved by incorporating into at least one of the binders used in the magnetic layer and the backing layer, vinyl chloride type polymer resins having a unit of vinyl chloride in an amount of 70 wt% or more, a nitrogen content of from 0.01 to 1 wt% and a degree of polymerization of from 250 to 700.

However, the above method has not been sufficiently satisfactory when extremely fine magnetic particles which are difficult to uniformly disperse are used.

SUMMARY OF THE INVENTION

An object of this invention is to provide a magnetic recording medium having excellent S/N characteristics and C/N characteristics which is resistant to charging, has reduced drop outs and is reliable.

Other objects and effects of this invention will be apparent from the following description.

To achieve the above other objects, the present invention provides a magnetic recording medium comprising a non-magnetic support having provided thereon a magnetic layer containing magnetic particles dispersed in a binder, said binder containing (a) a vinyl chloride polymer resin having a vinyl chloride unit in an amount of 70 wt% or more, nitrogen in an amount of from 0.01 to 1 wt% and a degree of polymerization of from 250 to 700, and (b) a polyurethane having an amino group in an amount of from $10^{-6}$ to $10^{-3}$ eq/g.

Thus, the present inventors have conducted research to improve the S/N characteristics and to improve the prevention of drop outs in a magnetic recording medium, and as a result found that by the combination use of the above-described vinyl chloride polymer resins and special polyurethane resins as a binder for a magnetic layer, dispersibility of the above described extremely fine magnetic particles can largely be improved, and squareness ratio, residual magnetic flux density, C/N characteristics and S/N characteristics can be greatly improved. Further, in accordance with the combination use thereof, charging properties of the magnetic recording medium can further be improved synergistically, drop outs and decrease of output can be reduced remarkably, and thus excellent various characteristics at an initial stage can be maintained in variable environmental circumstances for a long period of time.

DETAILED DESCRIPTION OF THE INVENTION

The present inventor has discovered that the presence of certain vinyl chloride polymer resins and certain polyurethanes in combination, as a binder in a magnetic layer brings about improved magnetic recording mediums.

The above described vinyl chloride polymer resins are resins having a vinyl chloride unit in an amount of 70 wt% or more, nitrogen in an amount of from 0.01 to 1 wt% and a degree of polymerization of from 250 to 700.

The above-described vinyl chloride polymer resins are preferably nitrogen-containing vinyl chloride polymer resins having a nitrogen atom-containing substituent which is preferably an amino substituent such as a mono-substituted amino group, a di-substituted amino group, or an ammonium salt group.

More specifically, the above-described polymer resins are copolymers of vinyl chloride monomer with (1) a nitrogen atom-containing vinyl monomer having the following formula (1):

and/or (2) a nitrogen atom-containing acrylic acid ester having the following formula (2):

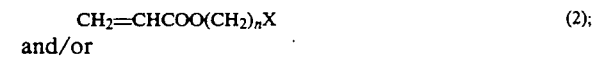

and/or (3) a nitrogen atom-containing methacrylic acid ester having the following formula (3):

$$CH_2=C(CH_3)COO(CH_2)_nX \qquad (3)$$

wherein in each of formula (1), (2), and (3), X is

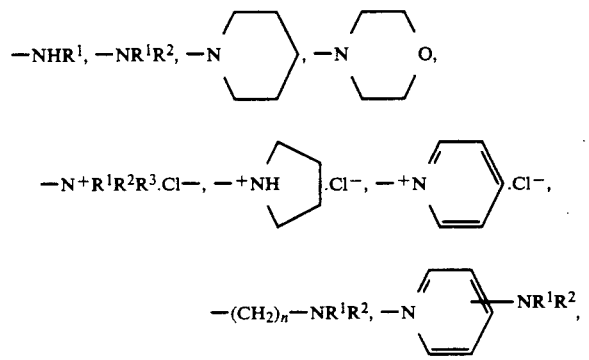

$-CONR^1R^2$, $-O(CH_2)_n-NR^1R^2$, Rhu 1, $R^2$ and $R^3$, which may be the same or different, each is a hydrogen atom, an alkyl group having from 2 to 5 carbon atoms, a phenyl group, or a phenyl group substituted with (i) an alkyl group having from 1 to 5 carbon atoms or (ii) a hydroxyalkyl group having from 1 to 5 carbon atoms; and/or (4) a nitrogen atom-containing monomer such as vinyl pyridine, vinyl pyrrolidone or vinyl maleimine.

The above-described nitrogen-containing vinyl chloride polymer resins can be prepared by conventional technology. For example, the above resins can be prepared by copolymerizing a vinyl chloride monomer with the above-described nitrogen atom-containing monomer, or by copolymerizing the vinyl chloride monomer, the nitrogen atom-containing monomer and an auxiliary copolymerizable monomer.

The above-described auxiliary copolymerizable monomers include vinyl acetate, vinyl propionate, methacrylic acid ester, acrylic acid ester, methacrylic acid, acrylic acid, maleic anhydride, maleic acid, acrylonitrile, vinylidene chloride, hydroxyethyl methacrylate, hydroxyethyl acrylate, glycidyl methacrylate, and glycidyl acrylate.

The above-described polymer resins can be also prepared by reacting the chlorine atom in polyvinyl chloride resins or the above-described nitrogen-containing vinyl chloride polymer resins with a primary amine, secondary amine or tertiary amine, e.g., ethyl amine, propyl amine, butyl amine, cyclohexyl amine, ethanol amine, naphthyl amine, anilin, o-toluidine, dimethylamine, dipropyl amine, dibutyl amine, dioctyl amine, diisobutyl amine, diethanol amine, N-methyl aniline, trimethyl amine, triethyl amine, tri-isobutyl amine, tridecyl amine, N-methyldiphenyl amine, hexamethylene tetramine, triethanol amine, tributyl amine, pyridine, α-picoline, β-picoline, 2,4 lucidine, quinoline and morpholine. The above manufacturing methods are disclosed, for example, in Kobunshi Gosei Jikkenho (Experiments of synthesizing high molecular compounds) authored by Takayuki Ohtsu, published by Kagaku Dojinsha, Japan in 1972, and are known and can be utilized in this invention.

The above-described nitrogen-containing vinyl chloride polymer resins employed in this invention are resins having a vinyl chloride unit content of 70 wt% or more, preferably from 70 to 98 wt%, a nitrogen content of from 0.01 to 1 wt%, preferably from 0.02 to 0.50 wt%, more preferably from 0.03 to 0.20 wt%, and having a degree of polymerization of from 250 to 700, preferably from 300 to 500. Therefore, in the preparation of the above described nitrogen containing vinyl chloride polymer resins, the amount of nitrogen containing monomers to be used and the amount of amines to be reacted with Cl in the vinyl chloride unit are adjusted so that the content of nitrogen in the resins falls within the ranges as above. Further, the thus-obtained vinyl chloride copolymer can be saponified to convert vinyl acetate and vinyl propionate moieties to vinyl alcohol.

When the content of the vinyl chloride unit in the above-described nitrogen-containing vinyl chloride polymer resins is lower than the range defined as above, the physical strength of the magnetic layer decreases. When the content of the vinyl chloride unit is higher than the range as defined above, the solubility of the resins in a solvent decreases. Both of the above cases are unfavorable to the preparation of a magnetic coating composition. When the content of nitrogen is lower than the range defined as above, the dispersibility of ferromagnetic particles decreases, thereby decreasing surface smoothness of the magnetic layer. On the contrary, when the content of nitrogen is higher than the range defined as above, the above dispersibility and surface smoothness decrease, and the solubility of the resins decreases, and as a result, the resins do not function as a binder.

Further, when the average degree of polymerization of the resins is lower than the above range, the physical strength decreases in such a manner that the magnetic layer becomes fragile, and the durability of the magnetic recording medium decreases. On the other hand, when the average degree of polymerization thereof is higher than the above range, the viscosity of a solution having a predetermined concentration becomes higher, and operation and handling of the resins becomes quite difficult.

In the case when, instead of the above-described nitrogen-containing vinyl chloride polymer resins, vinyl chloride polymer resins which do not contain a nitrogen atom and the above-described amine compound are simply added and dispersed, without reacting with each other, into the composition for forming the magnetic layer, the dispersibility of the ferromagnetic particles decreases with passage of time, although the dispersibility of the ferromagnetic particles and surface smoothness of the magnetic layer are slightly improved.

As another component of the binder used in this invention, the polyurethane is a polyurethane having an amino group in an amount of from $10^{-6}$ to $10^3$ eq/g, and preferably from $1 \times 10^{-5}$ to $3 \times 10^{-4}$ eq/g. The above described "amino group" is selected from the group connecting of a primary amino group ($-NH_2$), a secondary amino group ($-NHR_4$), a tertiary, amino group ($-NR^4R^4$), and

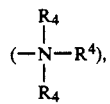

wherein $R^4$ is an aliphatic hydrocarbon group or an aromatic hydrocarbon group, and when there are two or more $R^4$ groups, they may be the same or different, or two $R^4$ groups may bond to form a ring.

The above-described polyurethane may contain the amino group in the main chain as a component of the main chain, or may contain the amino group in a side chain. The amino group at a side chain may be directly bonded with a carbon atom in the main chain, and may be bonded with a carbon atom in the main chain through a connecting group selected from the group consisting of an alkyl group having from 1 to 25 carbon atoms, an aryl group having from 6 to 20 carbon atoms, an aralkyl group, an alkylaryl group, an oxygen atom, a carbonyl group, or a carbonyloxy group. Where the aforementioned connecting group is an alkyl group having from 1 to 25 carbon atoms, an aryl group having from 6 to 20 carbon atoms, an aralkyl group or an alkylaryl group, it is preferred that the connecting group contains an oxygen atom, a carbonyl group, or a carbonyloxy group in its chain. More preferably, the polyurethane has an amino group which is bonded with a carbon atom in its main chain through a group having from 3 to 20 carbon atoms. In that case, the electromagnetic characteristics of the thus-obtained magnetic recording medium are particularly desirably improved.

The specific examples of preferred amino groups are those groups represented by X, as defined in the above-described formulae (1), (2) and (3).

It is preferred that the above polyurethane have an average molecular weight of from about 10,000 to 200,000, more preferably from 20,000 to 150,000. When polyurethane having a molecular weight which is lower than 10,000 is used, the running durability of the tape deteriorates. When polyurethane having a molecular weight which is higher than 200,000 is used, solubility of the binder decreases and dispersibility becomes poor. These effects undesirable.

The above-described polyurethane can be prepared by conventionally known method of reacting a polyol such as an amino group containing polyol (e.g., a polyester polyol or polycarbonate polyol having the above-described amino group) or a polyol having no amino group (e.g., a polycarbonate polyol, or a polyester polyol) with diisocyanate.

The above-described amino group-containing polyols are those compounds having the above-described amino groups (such as those represented by X in formulae (1) to (3) hereinabove) at the main and the side chains of the polyol which is referred to hereinafter.

The above referred to polyester polyol (including polyester polyol containing amino groups and that containing no amono group) can be synthesized, for example, by polycondensing diols and dibasic acids, and by open ring polymerizing lactones such as caprolactone. The typical divalent alcohols include glycols such as ethylene glycol, propylene glycol, butane diol, 1,6-hexane diol or cyclohexane dimethanol. The typical dibasic acids include adipic acid, pimelic acid, azelaic acid, sebacic acid, phthalic acid and terephthalic acid. The amino group-containing polyester polyol can be obtained, e.g., by using an amino group-containing diol as the diol component.

The above referred to polycarbonate polyol (including polycarbonate polyol containing amino groups and that containing no amono group) is (I) a polycarbonate polyol having a molecular weight of from 300 to 20,000 and a hydroxyl value of from 20 to 300 which is synthesized by concensing or ester exchanging, for example, (a) polyhydric alcohols having the formula (I):

HO—R⁵—OH  (I)

wherein R⁵ is, for example, —(CH₂)ₙ—(n=3 to 14),

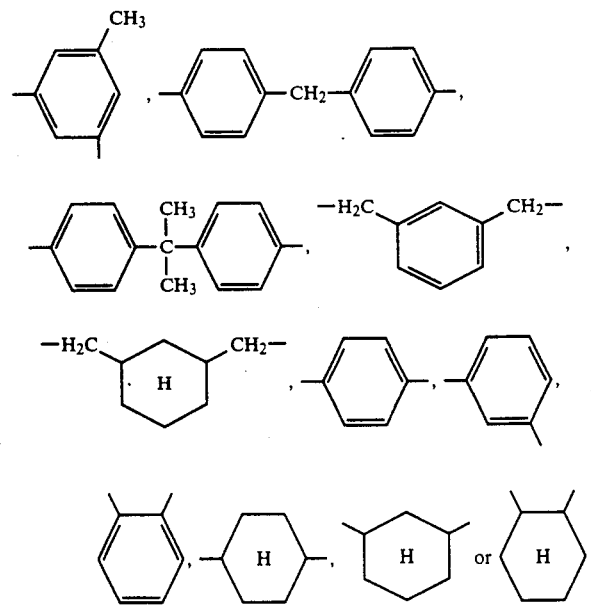

with (b) phosgene, chloroformate, dialkyl carbonte or diallylcarbonate, or (II) a polycarbonate polyester polyol having a molecular weight of from 400 to 30,000 and a hydroxyl value of from 5 to 300 which is obtained by condensing the above-described polycarbonate polyol (I) with a divalent carboxylic acid having the following formula (II):

HOOC—R⁶—COOH  (II)

wherein R⁶ is an alkylene group having from 3 to 6 carbon atoms, 1,4-, 1,3- or 1,2-phenylene group or 1,4-, 1,3- or 1,2-cyclohexylene group. The amino group-containing polycarbonate polyol can be obtained, e.g., by using an amino group-containing polyhydric alcohol as the polyhydric alcohol component.

The above-described polyol may be compounded with another polyol such as, for example, a polyether polyol, polyester ether polyol or polyester in an amount of up to 90 wt% of the above polyol.

The polyisocyanate which can be used for forming the polyurethane by reacting with the above polyols is not particularly limited and ca be any of the ones that are generally used. Examples of suitable polyisocyanates include hexamethylene diisocyanate, toluidine diisocyanate, isophorone diisocyanate, 1,3 xylylene diisocyante, 1,4-xylylene diisocyante, cyclohexane diisocyanate, toluidine diisocyanate, 2,4-tolylene diisocyanate, 2,6-tolylene diisocyanate, 4,4'-diphenylmethane diisocyanate, p-phenylene diisocyanate, m-phenylene diisocyanate, 1,5-naphthylene diisocyanate, 4,4-diphenylmethane diisocyanate and 3,3-dimethylphenylene diisocyanate.

Any known chain extending agent can be selected for use, such as the above-described polyhydric alcohol, aliphatic polyamine, alicyclic polyamine or aromatic polyamine.

As a specific example of the above amino group-containing polyol, an amino group containing polyol which is obtained by substituting a part of the diol or a part of the dibasic acid used to form the polyol with an amino group containing diol or an amino group containing dibasic acid can be used.

In addition to the above-described nitrogen-containing vinyl chloride polymer resins and the above-described amine-containing polyurethane, auxiliary binders can be used in an amount less than the total amount of the above two components as a binder. Auxiliary binders are not particularly limited, and those that are generally used for a magnetic recording medium can be used, such as thermoplastic resins, thermosetting resins, reactive type resins and mixtures thereof.

The above-described thermoplastic resins include those having a softening point of 150° C. or lower and having an average molecular weight of from 10,000 to 300,000 such as copolymers of vinyl chloride and vinyl acetate, copolymers of vinyl chloride and vinylidene chloride, copolymers of vinyl chloride and acrylonitrile, copolymers of acrylate and acrylonitrile, copolymers of acrylate and vinylidene chloride, copolymers of acrylate and styrene, copolymers of methacrylate and acrylonitrile, copolymers of methacrylate and vinylidene chloride, copolymers of methacrylate and styrene, urethane elastomer, nylon-silicon resins, nitrocellulose-polyamide resins, polyvinyl fluoride, copolymers of vinylidene chloride and acrylonitrile, copolymers of butadiene and acrylonitrile, polyamide resins, polyvinyl butyral, cellulose derivatives (such as, for example, cellulose acetate butyrate, cellulose diacetate, cellulose triacetate, cellulose propionate, nitrocellulose), copolymers of styrene and butadiene, polyester resins, copolymers of chlorovinyl ether and acrylate, amino resins and various synthetic rubber type thermoplastic resins. Copolymers and polymers of vinyl chloride, copolymers and polymers of vinylidene chloride, and nitrocellulose are particularly preferred among these resins.

The above-described thermosetting resins or reactive type resins which can be used are those that have a molecular weight of 200,000 or lower in the state of a coating composition and when these resins are heated after coating and drying, their molecular weight becomes much higher. Examples of these resins include phenolic resins, phenoxy resins, epoxy resins, polyurethane hardenable resins, urea resins, melamine resins, alkyd resins, silicon resins, acrylic type reactive resins, epoxy-polyamide resins, nitrocelulose-melamine resins, a mixture of a high molecular weight polyester resins and isocyanate prepolymer, a mixture of copolymers of methacrylate and diisocyanate prepolymer, a mixture of polyester polyol and polyisocyanate, urea formaldehyde resins, a mixture of a low molecular weight glycol, a high molecular weight diol and triphenyl methane triisocyanate, polyamine resins and mixtures thereof. Polyurethane, phenoxy resins and epoxy resins are particularly preferred among these resins.

Further, compounds having at least two isocyanate groups (polyisocyanates) may be included in the above binder. Such polyisocyanates include isocyanates such as tolylene diisocyanate, 4,4'-diphenylmethane diisocyanate, hexamethylene diisocyanate, xylylene diisocyanate, naphthylene-1,5-diisocyanate, o-toluidine diisocyanate, isophorone diisocyanate or triphenylmethane triisocyanate, reaction products of these isocyanates and polyalcohols, and polyisocyanates produced by condensing these isocyanates. The above polyisocyanates are commercially available in the trade name of "Collonate L", "Collonate HL", "Collonate 2030", "Collonate 2031", "Collonate 2036", "Collonate 3015", "Collonate 3041", "Collonate 2041", "Millionate MR", "Millionate MTL", "Dult Sec 1350", "Dult Sec 2170"and "Dult Sec 2280"(made by Nippon Polyurethane Industry Co., Ltd.), Takenate D-102", "Takenate D-110N", "Takenate D-200", and "Takenat D-202"made by Takeda Chemical Industries, Ltd., "Desmodule L", "Desmodule IL", "Desmodule N", and "Desmodule HL" made by Sumitomo Bayer Co., Ltd.

The compounding ratio of ferromagnetic particles and the binder in the magnetic layer of the magnetic recording medium of this invention is preferably from 15 to 100 parts by weight, more preferably from 15 to 50 parts by weight, of the binder per 100 parts by weight of magnetic particles. When the compounding ratio of the binder is less than the above range, running durability of the magnetic recording medium deteriorates. When the compounding ratio is more than the above range, the packing density of the ferro-magnetic particles decreases, whereby desired electro-magnetic characteristics cannot be obtained, and the friction coefficient tends to increase.

The binder in the magnetic layer of the magnetic recording medium of this invention is preferably composed of the above-described nitrogen-containing vinyl chloride polymer resins in an amount of from 10 to 60 wt%, the above described amine containing polyurethane in an amount of from 10 to 70 wt%, the above polyisocyanate in an amount of from 5 to 60 wt% and auxiliary binders in an amount of from 0 to 50 wt%, and particularly preferably composed of the above-described nitrogen containing vinyl chloride polymer resins in an amount of from 30 to 60 wt%, the above described amine containing polyurethane in an amount of from 15 to 60 wt%, the above described polyisocyanate in an amount of from 10 to 50 wt% and auxiliary binders in an amount of from 0 to 30 wt%.

The ratio of the above-described nitrogen-containing vinyl chloride polymer resins and the above-described amine-containing polyurethane is preferably from 10 to 200 parts by weight, more preferably from 15 to 150 parts by weight, of the above-described amine-containing polyurethane per 100 parts by weight of the above-described nitrogen-containing vinyl chloride polymer resins. When the content of the above-described amine-containing polyurethane is less than the above range, durability, particularly durability at a low temperature deteriorates, and when it is more than the above range, running properties, particularly running properties at a high temperature deteriorate, and head stain becomes heavy.

Ferromagnetic fine particles which can be used in the magnetic layer of the magnetic recording medium of this invention are those conventionally used as ferromagnetic particles, such as γ-iron oxide ferro-magnetic particles, cobalt-containing γ-iron oxide ferromagnetic particles, ferromagnetic metals, alloy particles, iron nitride ferromagnetic particles, barium ferrite and strontium ferrite.

The non-magnetic supports which can be used in the practice of the present invention are not particularly limited and those that are generally used can be used. Examples of materials which can be used to form the non-magnetic support include various synthetic resin films such as polyethylene terephthalate, polypropylene, polycarbonate, polyethylene naphthalate, polyamide, polyamide imide or polyimide and metal foils such as an aluminum foil or a stainless foil. The thickness of the support is not particularly limited, and is generally from 2.5 to 100 μm, preferably from 3 to 70 μm.

The magnetic recording medium of the present invention, which employs the special combination of binders in the magnetic layer, can be prepared in accordance with conventional technology.

For example, to prepare a magnetic layer of the magnetic recording medium of this invention, ferro-magnetic particles and binders, conventional additives such as organic or inorganic filling materials, carbon black, dispersing agents, antistatic agents, lubricating agents or abrasive agents are mixed and kneaded with a solvent to prepare a magnetic coating composition.

The above-described filling materials are not particularly limited, and those granular filling materials having an average particle diameter of from 0.01 to 0.8 $\mu$m, preferably from 0.06 to 0.4 $\mu$m are generally used. Examples of the above filling materials include particles of graphite, tungsten disulfide, boric nitride, calcium carbonate, aluminum oxide, iron oxide, titanium dioxide magnesium oxide, zinc oxide, calcium oxide, lithopone and talc. These materials can be used alone or in mixture.

Furnace black, thermal black, black for coloring and acetylene black can be used as carbon black. Regarding preferable properties of carbon black, the average particle size is from 5 to 1,000 m$\mu$ (determined by an electrone microscope), nitrogen adsorption specific surface area is from 1 to 800 m$^2$/g, pH is from 4 to 11 (JIS K6221), and dibutyl phthalate oil absorption amount is from 10 to 800 ml/100 g (JIS K6221). Regarding sizes of carbon black, carbon black having a particle size of from 5 to 100 m$\mu$ is used to reduce the surface electric resistance of the coated film, carbon black having a particle size of from 50 to 1,000 m$\mu$ is used to control the strength of the coated film, and in order to control the surface roughness of the coated film, finer carbon black (100 m$\mu$ or lower) is used to reduce the spacing loss and to smoothen; and coarse carbon black (50 m$\mu$ or higher) is used to roughen the surface and to reduce friction coefficient. Finer carbon black and coarse carbon black can be used in combination. Carbon black of which surface is partially graphited or grafted can be used.

Examples of dispersing agents which can be used include fatty acids having from 10 to 22 carbon atoms (e.g., caprylic acid, capric acid, lauric acid, myristic acid, palmitic acid, stearic acid, oleic acid, elaidic acid, linolic acid, linolenic acid and stearolic acid), metal soaps of the above fatty acids with alkali metals (e.g., lithium, sodium, potassium) or with alkali earth metals (e.g., magnesium, calcium, barium), esters of the above fatty acids, esters of the above fatty acids of which hydrogen atoms are partially or wholly substituted with fluorine atoms, amides of the above fatty acids, aliphatic amine, higher alcohols, polyalkylene oxide alkyl phosphate, alkyl phosphate, alkyl borate, sarcosinates, alkyl ether esters, trialkyl polyolefin oxyquaternary ammonium salt, and lecithin. The dispersing agents can be used in an amount of from 0.05 to 20 parts by weight per 100 parts of a binder.

Examples of antistatic agents which can be used include electro-conductive particles such as carbon black, or carbon black graft polymer; natural surface active agents such as saponin; nonionic surface active agents such as alkylene oxide agents, glycerine agents and glycidole agents; cationic surface active agents such as higher alkyl amines, quaternary ammonium salts, pyridine and salts of another heterocyclic compounds, phosphoniums or sulphoniums; anionic surface active agents such as carboxylic acid, sulfonic acid, phosphoric acid, agents having an acid group such as a sulfate or phosphate groups; and amphoteric surface active agents such as amino acids, amino sulfonic acids, sulfate or phosphate of amino alcohol. When the above electro-conductive particles are used as an antistatic agents, those particles can be used in an amount of from 0.2 to 20 parts by weight per 100 parts by weight of a binder. When surface active agents are used as an antistatic agent, they can be used in an amount of from 0.1 to 10 parts by weight.

Examples of lubricating agents which can be used include fatty acid esters composed of monobasic fatty acid having from 12 to 20 carbon atoms such as the above fatty acids, higher alcohols, butyl stearate or sorbitan oleate and monohydric or polyhydric alcohols having from 3 to 20 carbon atoms, mineral oil, animal and vegetable oil, olefin low polymer $\alpha$-olefin low polymer, conventional lubricating agents such as silicon oil, graphite particles, molybdenum disulfite, or teflon particles and lubricating agents for plastics. The additive amount of lubricating agents can be determined optionally in accordance with conventional technologies.

Examples of abrasive agents which can be used include $TiO_2$, $TiO$, $ZnO$, $CaO$, $SnO_2$, $SiO_2$, $\alpha$-$Fe_2O_3$, $Cr_2O_3$, $\alpha$-$Al_2O_3$, $ZnS$, $MoS_2$, $BaSO_4$, $CaSO_4$, $MgCO_3$, $BN$ and $SiC$. These inorganic filling materials may be used alone or in mixture. The additive amount thereof can be from 0.01 to 50 parts by weight per 100 parts by weight of a binder.

The solvent used for mixing and kneading is not particularly limited, and those that are generally used for preparing a magnetic coating composition can be used.

The method for mixing and kneading is not particularly limited, and the order of adding each component is optionally determined.

The mixing and kneading devices for preparing the magnetic coating composition are those generally used, such as a two roll mill, a three roll mill, a ball mill, a pebble mill, a tron mill, a sand grinder, Szegvari attritor, a high speed impeller dispersing device, a high speed stone mill, a high speed impact mill, a disperser, a kneader, a high speed mixer, a homogenizer or an ultrasonic dispersing device.

In this instance, the effects and functions of the above-described additives such as dispersing agents, anti-static agents or lubricating agents should not be limited to those as described above, and a dispersing agent may function, for example, as a lubricating agent or an anti-static agent. Accordingly, it should be understood that the above classification of the additives due to their functions are not decisive. If additives having multi-functions are used, the additive amounts thereof should preferably be determined in light of the multiple effects.

In addition to the above, other additives such as detergents, viscosity index improvers, pour point depressants and defoaming agents can be added.

The magnetic coating composition is coated on the above-described non-magnetic support. The coating composition can be directly coated on the non-magnetic support or can be coated on an adhesive layer on the non-magnetic support.

The methods for coating on the non-magnetic support include an air doctor coating method, a blade coating method, a rod coating method, an extrusion coating method, an air knife coating method, a squeeze coating method, an impregnating coating method, a reverse roll coating method, a transfer roll coating method, a gravure coating method, a kiss coating method, a cast coating method, a spray coating method and a spin coating method. Other methods beside the above can also be used.

The magnetic coating composition can be coated to obtain a dry thickness of the magnetic layer of generally from about 0.5 to 10 μm, preferably from 1.5 to 7.0 μm.

The magnetic layer thus coated on the non-magnetic support can then be provided with magnetic orientation to orientate ferromagnetic particles, dried, and if desired, provided with a surface smoothing treatment and thereafter slit to a desired shape.

Any known backing layer may be provided on the surface of the non-magnetic support opposite to the surface provided with the magnetic layer.

The present invention will be illustrated in more detail by the following Examples and Comparative Examples. However, this invention is not to be construed as being limited to the Examples.

In each Example, all parts are by weight.

The nitrogen-containing vinyl chloride polymer resins and amino group-containing polyurethane used in each example were prepared in the following manner.

Nitrogen-containing vinyl chloride polymer resin

The nitrogen-containing vinyl chloride polymer resins I to IV were prepared by a copolymerizing method as disclosed in the aforesaid Kobunshi Gosei Jikkenho (Experiments of synthesizing high molecular compounds) authored by Takayuki Ohtsu, published by Kagaku Dojinsha, Japan in 1972. The monomer composition, degree of polymerization and the content of nitrogen of these resins are shown in Table 1. The nitrogen content of the polymer resin was measured in accordance with "Kjehldahl method" as disclosed in Koqyo Bunseki Kaqaku (Industrial Analysis Chemistry) (second vol.), (authored by Tsugio Takeuchi, published by Gakujutsu Shuppansha, Japan in 1970) pp. 331 to 336.

The nitrogen-containing vinyl chloride polymer resin V was prepared by the following method.

100 parts of vinyl chloride, vinyl acetate and maleic acid copolymer resins (400x110A; manufactured by Nippon Zeon Co., Ltd.), 200 parts of methanol, 200 parts of toluene, 10 parts of sodium hydroxide and 20 parts of diethanol amine were introduced in a reaction vessel and reacted at 50° C. for 10 hours. The reaction product was washed with 1,000 parts of methanol for 5 times and with 1,000 parts of distilled water three times and was dried to obtain a nitrogen containing vinyl chloride polymer resin V. The nitrogen content of resin V was 0.08%.

Amino group-containing polyurethane

The same procedure as that disclosed in Polyurethane Jushi (Polyurethane resin), published by Nikkan Kogyo Press, Japan in 1969 was followed to prepare an amino group-containing polyurethane except that the divalent alcohol or dibasic acid was partially substituted with an amino group-containing diol or an amino group containing dibasic acid.

The amino group content, skeleton components and the molecular weights of the thus-obtained amino group containing polyurethane are shown in Table 2.

TABLE 1

| Resin No. | Unit of vinyl chloride (wt %) | Unit of nitrogen-containing monomer | (wt %) | Unit of other components of copolymer | (wt %) | Degree of polymerization | Nitrogen content (%) |
|---|---|---|---|---|---|---|---|
| I | 86.0 | 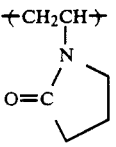 | 0.3 | 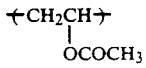 | 13.7 | 600 | 0.083 |
| II | 80.0 | 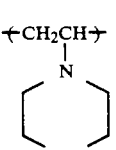 | 0.1 | —(CH₂CH)— OH | 2.9 | 420 | 0.010 |
|   |   |   |   | —(CH₂CH)— OCOCH₃ | 17.0 |   |   |
| III | 92.0 | 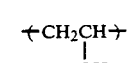 | 0.8 | 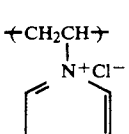 | 1.2 | 470 | 0.080 |
|   |   |   |   | —(CH₂CH)— OCOCH₃ | 6.0 |   |   |
| IV | 86.0 |  | 0.7 | —(CH₂CH)— OCOCH₃ | 10.6 | 290 | 0.100 |

TABLE 1-continued

| Resin No. | Unit of vinyl chloride (wt %) | Unit of nitrogen-containing monomer | (wt %) | Unit of other components of copolymer | (wt %) | Degree of polymerization | Nitrogen content (%) |
|---|---|---|---|---|---|---|---|
| V | 88.0 | −CH₂CH− <br> \| <br> N−CH₂CH₂OH <br> \|<br> CH₂CH₂OH | 0.75 | $+CH_2CH+$ <br> \| <br> COOCH₂CHCH₂ <br> \\O/ <br><br> −CHCH− <br> \| \| <br> OC CO <br> \\O/ <br> /−CH₂CH− <br> \| <br> CO₂CH₃ | 2.7 <br><br><br> 3.75/7.5 | 400 | 0.035 |

TABLE 2

| | Amino group | | | Skeleton | | | | | |
|---|---|---|---|---|---|---|---|---|---|
| No. | Amino group containing materials | Classification* | Ratio of amino group (10⁻⁶ eq./g) | Diol (A) | Di-carboxylic acid (B) | Disso-cyanate (C)** | Chain extending agent (D) | Ratio A/B/C/D (mol) | Molecular weight |
| I | HO(CH₂)₂̄N(CH₂)₂̄OH <br> \| <br> * <br><br> *<br> \|<br>(CH−CH₂−O)₈−C(CH₂)₂N(Me)(Me) <br> \|           ‖ <br> CH₃         O | A | 70 | 1,6-hexane diol | Adipic acid | MDI | 1,6-hexane diol | 11/10/1.20/2.66 | 60,000 |
| II | HOCH₂CHCH₂OH <br> \| <br> O <br> \| <br> * <br><br> *<br> \|   O   Me<br> \|   ‖   / <br> (CH₂CH₂O)₃C(CH₂)₃N <br>          \\ <br>           Me | A | 55 | 1,4-butane diol <br><br> Cyclo-hexane di-methanol | Phthalic acid <br><br> Sebassic acid | TDI | 1,4-butane diol | 8/7/1.2/3.0 | 48,000 |
| III | HOC⬡COH <br> ‖   ‖ <br> O   O <br>     \| <br>    N(CH₃)₂ | B | 120 | 1,6-hexane diol | Azelaic acid | HMDI | 1,6-hexane diol | 9/8/1.2/2.5 | 78,000 |
| IV | HO(CH₂)₂̄N(CH₂)₂̄OH <br> \| <br> Me | A | 8 | Neo-pentyl glycol | Adipic acid | MDI | 1,4-butane diol | 11/10/1.3/3.0 | 36,000 |

Note:
*A: The amino group-containing material was used as the diol component.
B: The amino group-containing material was used as the dicarboxylic acid component.
**MDI: Diphenylmethane diisocyanate
**TDI: Tolylene diisocyanate
**HMDI: Hexamethylene diisocyanate

EXAMPLE 1

The coating composition for a magnetic layer having the following composition and which was prepared in the following manner was coated on a polyethylene terephthalate base (non-magnetic support) having a thickness of 10 μm. The coating compositions were then provided with a magnetic orientation treatment using cobalt magnets and was dried by passing through the atmosphere at 100° C. to form a magnetic layer having a thickness of 3.0 μm.

PREPARATION OF A COATING COMPOSITION FOR A MAGNETIC LAYER

| Formulation: | |
|---|---|
| Ferromagnetic Fe—Ni alloy particles (Ni content: about 5 wt %, specific surface area (S-bet): 45 m²/g) | 100 parts |
| Nitrogen-containing vinyl chloride Polymer resin I | 12 parts |
| Amino group containing polyurethane I | 8 parts |
| Polyisocyanate ("Collonate 3041" made by Nippon Polyurethane Co., Ltd.) | |
| Stearic acid | 2 parts |
| Octyl laurate | 1 part |

-continued

| Formulation: | |
|---|---|
| Carbon black (Average particle diameter: 40 mμ, oil absorption amount 160 ml/100 g) | 3 parts |
| Methyl ethyl ketone | 300 parts |

Preparation

The above composition was put in a ball mill, mixed and dispersed sufficiently to prepare a coating composition for a magnetic layer.

On the surface of a support opposite to the surface provided with a magnetic layer, a coating composition for a backing layer thus prepared in the following manner, and was coated and dried in a manner similar to the formation of the above magnetic layer to form a backing layer having a 2 μm thickness.

PREPARATION OF A COATING COMPOSITION FOR A BACKING LAYER

| Formulation: | |
|---|---|
| Carbon black (Average particle diameter: 20 mμ) | 100 parts |
| Carbon black ("Raven MTP", made by U.S. Columbia Carbon Co., Ltd., average particle diameter: 250 mμ) | 30 parts |
| Polyurethane resin ("Nipporan N-2304" made by Nippon Polyurethane Co., Ltd.) | 30 parts |
| Polyvinylidene chloride resin ("Saran" made by U.S. Dow-Chemical Co., Ltd.) | 30 parts |
| Copper oleate | 0.2 part |
| Methyl ethyl ketone | 800 parts |

Preparation

The above composition was mixed, kneaded and dispersed in a ball mill, and thereafter 10 parts of polyisocyanate compound ("Collonate 3041" made by Nippon Polyurethane Co., Ltd.) was added thereto and further mixed and dispersed uniformly to prepare a coating composition for the backing layer.

Then, both the magnetic layer and the backing layer were provided with a calendering treatment and cut to a tape shape having a width of ½ inch to prepare a VHS type video tape. That tape was identified as Sample of Example 1.

EXAMPLE 2

PREPARATION OF A COATING COMPOSITION FOR A BACKING LAYER

| Formulation: | |
|---|---|
| Co containing γ-Fe$_2$O$_3$ particles Co was contained in 3 wt % per γ-Fe$_2$O$_3$, and Fe$^{2+}$ was contained in 5 wt % Fe$^{3+}$, Nitrogen absorption specific surface area: 35 m$^2$/g) | 100 parts |
| Nitrogen containing vinyl chloride Copolymer resin II | 10 parts |
| Amino group containing polyurethane II | 10 parts |
| Lecithin | 1 part |
| Myristic acid | 3 parts |
| Ethyl stearate | 2 parts |
| Lauric acid | 1 part |
| Butyl acetate | 400 parts |

-continued

| Formulation: | |
|---|---|
| Methyl ethyl ketone | 200 parts |

Preparation

The above composition was mixed, kneaded and dispersed in a ball mill, 6 parts of the above "Collonate 3041" was mixed, further uniformly dispersed, and the viscosity of the dispersion was controlled to prepare a coating composition for a magnetic layer.

The thus-prepared coating composition was coated on a support of a polyethylene terephthalate film in a dry thickness of 5 μm, provided with magnetic orientation and dried to form a magnetic layer.

On the other hand, a backing layer was provided on the surface of the support opposite to the surface provided with the above-described magnetic layer in the same manner as in Example 1 by coating the same coating composition for a backing layer as used in Example 1, except that 120 parts of carbon black ("Conductex SC", average particle diameter of 30 mμ, and oil absorption amount of 200 ml/100 g, made by U.S. Columbia Carbon Co., Ltd.) was additionally added into the composition of Example 1.

Then, both the magnetic layer and backing layer were provided with a calendering treatment and cut to a tape shape having a width of ½ inch to prepare a VHS tape video tape. That tape was identified as Sample of Example 2.

EXAMPLE 3

A video tape was prepared in the same manner as in Example 1 by coating the same coating composition for a magnetic layer as used in Example 1, except that 12 parts of the nitrogen-containing vinyl chloride polymer resin III was used instead of 12 parts of the nitrogen-containing vinyl chloride polymer resin 1, and 8 parts of the amino group-containing polyurethane III was used instead of 8 parts of the amino group containing polyurethane I in the coating composition of Example 1. The tape was identified as Sample of Example 3.

EXAMPLE 4

A video tape was prepared in the same manner as in Example 1 by coating the same coating composition for a magnetic layer as used in Example 1, except that 6 parts of the nitrogen-containing vinyl chloride polymer resin IV was used instead of 12 parts of the nitrogen-containing vinyl chloride polymer resin 1, and 14 parts of the amino group-containing polyurethane IV was used instead of 8 parts of the amino group-containing polyurethane 1 in the coating composition of Example 1. The tape was identified as Sample of Example 4.

COMPARATIVE EXAMPLE 1

A video tape was prepared in the same manner as in Example 1 by coating the same coating composition for a magnetic layer as used in Example 1, except that 12 parts of a vinyl chloride, vinyl acetate and maleic acid co-polymer resin (400×110A: made by Nippon Zeon Co., Ltd.) was used instead of 12 parts of the nitrogen-containing vinyl chloride polymer resin 1 in the coating composition of Example 1. The tape was identified as Sample of Comparative Example 1.

EXAMPLE 5

A video tape was prepared in the same manner as in Example 1, except that the nitrogen-containing vinyl chloride polymer resin V was used instead of the nitrogen-containing vinyl chloride polymer resin 1 and 8 parts of the amino group-containing polyurethane IV was used instead of 8 parts of the amino group-containing polyurethane I in the magnetic coating composition of Example 1. The tape was identified as Sample of Example 5.

COMPARATIVE EXAMPLE 2

A video tape was prepared in the same manner as in Example 1 except that the carboxyl group-containing polyurethane ("TIM-3005", made by Sanyo Kasei Kogyo Co., Ltd.) was used instead of the amino group-containing polyurethane I in the magnetic coating composition for the magnetic layer of Example 1. The tape was identified as Sample of Comparative Example 2.

Characteristics of each sample thus prepared above were evaluated in the following manner and the results thereof are shown in Table 3.

Screen chroma noise (C/N)

Screen signals of image signals 30 IRE (The Institute of Radio Engineers) superimposed with carrier waves amplitude of 100% were recorded at a standard recording current. These signals were reproduced through a high frequency filter of 1 kHz and a low frequency filter of 500 kHz and the AM component of the chroma noise in the reproduced signals were measured using a noise measuring device. The screen chroma noise of the samples is shown in terms of relative values based on the standard value (Comparative Example 2) which was measured in the same manner as above.

Drop Out

Drop out is shown by the number of drop outs per minute which occurred after the repeated usage of 250 passes. Drop out was counted by a drop out counter when the reproduced output level decreased by 16 dB or more for $5 \times 10^{-6}$ sec or more.

Gross

Gross was measured using a Suga Gloss meter at an angle of incidence of 45°.

Reproduced Output

Screen signals of image signals 50 IRE were recorded at a standard recording current. The average value of the envelope of the reproduced RF output was measured by an oscilloscope and the reproduced output was calculated by the following formula:

Reproduced output = $20 \log_{10} V/V_o$
V : average value
Vhd o : Standard value (Comparative Example 2)

Still life

Screen signals of image signals 50 IRE were recorded and were reproduced on a still mode. The reproduced RF output level was measured by a recorder and the period of time for the signal level to decrease by half was measured.

Decrease of output

The reproduced output after repeated usage of 100 passes was compared with the initial reproduced output prior to repeated usage and is shown in terms of relative values when initial output was 0 dB.

TABLE 3

| Example | Gloss | Reproduced output (dB) | C/N (dB) | Still life | Drop out | Decrease of output (dB) |
|---|---|---|---|---|---|---|
| Example 1 | 198 | +3.2 | +1.8 | 60 min. or more | 8 | 0.3 |
| Example 2 | 196 | +3.0 | +1.5 | 60 min. or more | 7 | 0.6 |
| Example 3 | 185 | +2.2 | +0.8 | 60 min. or more | 10 | 0.8 |
| Example 4 | 180 | +2.0 | +0.5 | 60 min. or more | 16 | 0.5 |
| Example 5 | 192 | +2.9 | +1.6 | 60 min. or more | 8 | 0.4 |
| Comparative Example 1 | 150 | −0.5 | −0.5 | 35 min. | 180 | 2.5 |
| Comparative Example 2 | 165 | 0 | 0 | 20 min. | 250 | 2.8 |

It is clear from the results shown in Table 3 that video tapes obtained in each of the Examples had higher C/N and much less number of occurrences of drop out per unit time than those tapes obtained in each Comparative Example.

This invention is a remarkably effective magnetic recording medium having strikingly improved strength of the magnetic layer and improved running durability and having remarkably reduced occurrences of drop out, because the magnetic recording medium of this invention uses as a binder for the magnetic layer a pre-determined nitrogen-containing vinyl chloride polymer resin and a pre-determined amino group-containing polyurethane in combination, and as a result of synergistic effects, dispersibilities of ferromagnetic particles and non-magnetic particles are greatly improved.

While the invention has been described in detail and with reference to specific embodiments thereof, it will be apparent to one skilled in the art that various changes and modifications can be made therein without departing from the spirit and scope thereof.

What is claimed is:

1. A magnetic recording medium comprising a non-magnetic support having provided thereon a magnetic layer containing magnetic particles dispersed in a binder, said binder containing:
   (a) a vinyl chloride polymer resin having a vinyl chloride unit in an amount of 70 wt% or more, nitrogen in an amount of from 0.01 to 1 wt% and a degree of polymerization of from 250 to 700, and
   (b) a polyurethane having an amino group in an amount of from $10^{-6}$ to $10^{-3}$ eq/g,
   wherein said polyurethane has an average molecular weight of from about 10,000 to 200,000, wherein the compounding ratio of ferromagnetic particles and the binder in the magnetic layer of the magnetic recording medium is from 15 to 100 parts by weight of the binder per 100 parts by weight of the ferromagnetic particles, and wherein the ratio of said polyurethane to said vinyl chloride polymer resin is from 10 to 200 parts by weight of said polyurethane per 100 parts by weight of said vinyl chloride polymer resin.

2. A magnetic recording medium as claimed in claim 1, wherein said vinyl chloride polymer resin has an amino substituent selected from the group consisting of a mono-substituted amino group, a di substituted amino group, and an ammonium salt group.

3. A magnetic recording medium as claimed in claim 1, wherein said binder contains a vinyl chloride polymer resin having a vinyl chloride unit in an amount of from 70 to 98 wt%, nitrogen in an amount of from 0.02 to 0.50 wt% and a degree of polymerization of from 300 to 500.

4. A magnetic recording medium as claimed in claim 1, wherein said polyurethane contains the amino group in its main chain.

5. A magnetic recording medium as claimed in claim 1, wherein said polyurethane contains the amino group at its side chain which is directly bonded with a carbon atom in the main chain of said polyurethane.

6. A magnetic recording medium as claimed in claim 5, wherein said polyurethane contains the amino group at its side chain which is directly bonded with a carbon atom in the main chain of said polyurethane, through a connecting group selected from the group consisting of an alkyl group having from 1 to 25 carbon atoms, an aryl group having from 6 to 20 carbon atoms, an aralkyl group, an alkylaryl group, an oxygen atom, a carbonyl group, a carbonyloxyl group, an alkyl group having from 1 to 25 carbon atoms and at least one of an oxygen atom, a carbonyl group and a carbonyloxy group, an aryl group having from 6 to 20 carbon atoms and at least one of an oxygen atom, a carbonyl group and a carbonyloxy group, an aralkyl group and at least one of an oxygen atom, a carbonyl group and a carbonyloxy group, and an alkylaryl group and at least one of an oxygen atom, a carbonyl group and a carbonyloxy group.

7. A magnetic recording medium as claimed in claim 1, wherein said binder contains said vinyl chloride polymer resin in an amount of from 10 to 60 wt%, polyurethane in an amount of from 10 to 70 wt%, polyisocyanate in an amount of from 5 to 60 wt% and an auxiliary binder in an amount of from 0 to 50 wt%.

8. A magnetic recording medium as claimed in claim 1, wherein said magnetic layer has a dry thickness of from about 0.5 to 10 $\mu$m.

* * * * *